United States Patent
Naito et al.

(10) Patent No.: US 8,022,894 B2
(45) Date of Patent: Sep. 20, 2011

(54) SCREEN SYNCHRONOUS CONTROL APPARATUS

(75) Inventors: Manami Naito, Tokyo (JP); Atsushi Tanaka, Tokyo (JP); Toshiyuki Hagiwara, Tokyo (JP); Yasunori Tsubaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1044 days.

(21) Appl. No.: 11/659,825

(22) PCT Filed: Aug. 30, 2004

(86) PCT No.: PCT/JP2004/012496
§ 371 (c)(1),
(2), (4) Date: Feb. 9, 2007

(87) PCT Pub. No.: WO2006/025093
PCT Pub. Date: Mar. 9, 2006

(65) Prior Publication Data
US 2008/0079658 A1    Apr. 3, 2008

(51) Int. Cl.
*G09G 5/00*    (2006.01)
(52) U.S. Cl. ............ 345/2.2; 345/1.1; 345/1.3; 348/500
(58) Field of Classification Search ............... 345/1.1, 345/1.2, 2.1, 2.2, 3.1, 3.2, 3.3; 348/500, 348/510, 512, 513
See application file for complete search history.

(56) References Cited

U.S. PATENT DOCUMENTS

| 5,606,336 A * | 2/1997 | Yuki ........................ 345/1.1 |
| 5,784,035 A * | 7/1998 | Hagiwara et al. ........... 345/1.3 |
| 5,956,046 A * | 9/1999 | Kehlet et al. ............... 345/502 |
| 2005/0128164 A1* | 6/2005 | Lan ........................ 345/1.1 |

FOREIGN PATENT DOCUMENTS

| JP | 5-328270 A | 12/1993 |
| JP | 6-214534 A | 8/1994 |
| JP | 7-319434 A | 12/1995 |
| JP | 9-204164 A | 8/1997 |
| JP | 10-260665 A | 9/1998 |
| JP | 2000-305553 A | 11/2000 |
| JP | 2000-322039 A | 11/2000 |
| JP | 2000-338944 A | 12/2000 |

* cited by examiner

*Primary Examiner* — Amare Mengistu
*Assistant Examiner* — Koosha Sharifi-Tafreshi
(74) *Attorney, Agent, or Firm* — Birch, Stewart, Kolasch & Birch, LLP.

(57) ABSTRACT

A screen synchronous control apparatus includes a reference timing transmitting unit 3 for transmitting a reference timing signal about display of a plurality of display screens 11, 12, and 13 at predetermined intervals, a display control unit 1 for transmitting a drawing instruction for displaying display data on the plurality of display screens 11, 12, and 13, and a plurality of display processing units 101, 201, and 301 each for receiving the drawing instruction transmitted from the display control unit 1, for executing the drawing instruction according to the reference timing signal transmitted from the reference timing transmitting unit 3, and for displaying the display data on the corresponding one of the display screens 11, 12, or 13.

2 Claims, 8 Drawing Sheets

SCREEN SYNCHRONOUS CONTROL APPARATUS

FIELD OF THE INVENTION

The present invention relates to a screen synchronous control apparatus for simultaneously displaying data in a plurality of display screens. Background of the Invention A problem with prior art multi screen synchronization systems is that because most of them are so constructed as to achieve time synchronization among two or more control apparatus, to issue a time stamp to a drawing instruction, or to achieve synchronization among two or more control apparatus in terms of signal processing using a mechanism for achieving synchronization between them, such as GenLock, the structure of the whole system becomes complicated.

Patent reference 1 discloses a system in which each of two or more control apparatus which are disposed for two or more display screens outputs a screen-display signal on the basis of inputted display information, when processing display elements relevant to two or more screens adjacent to the screen thereof, transmits a timing signal indicating that each of two or more control apparatus has been ready to perform a display process of displaying data on the display screen thereof to other control apparatus adjacent thereto, and, when receiving a timing signal indicating that another control apparatus has been ready to perform a display process of displaying data on the display screen thereof from the control apparatus, outputs an updated screen display signal. However, patent reference 1 simply relates to a technology for transmitting a timing signal to other adjacent control apparatus in order to secure the continuity of display elements, but does not disclose any technology for simultaneously generating screen displays.
[Patent reference 1] JP, 7-319434, A (see paragraph 0006)

The present invention is made in order to solve the above-mentioned problems, and it is therefore an object of the present invention to provide a screen synchronous control apparatus which can secure a synchronous display among two or more display screens with a simple structure by using a periodical reference timing signal when displaying data on two or more display screens.

DISCLOSURE OF THE INVENTION

In accordance with the present invention, there is provided a screen synchronous control apparatus including: a reference timing transmitting unit for transmitting a reference timing signal about display of a plurality of display screens at predetermined intervals; a display control unit for transmitting a drawing instruction for displaying display data on the above-mentioned plurality of display screens; and a plurality of display processing units each for receiving the drawing instruction transmitted from the above-mentioned display control unit, for executing the drawing instruction according to the reference timing signal transmitted from the above-mentioned reference timing transmitting unit, and for displaying the display data on a corresponding display screen.

Therefore, the present invention provides an advantage of being able to simultaneously display the same description on the plurality of display screens with the simple structure.

PREFERRED EMBODIMENTS OF THE INVENTION

Hereafter, in order to explain this invention in greater detail, the preferred embodiments of the present invention will be described with reference to the accompanying drawings.

Embodiment 1

In this embodiment 1, a synchronous control method of issuing only a reference timing signal at regular intervals via broadcast communications, transmitting drawing instructions one after another, and simultaneously displaying data at a timing determined by the reference timing signal by means of two or more receive sides will be explained.

Figure 1:
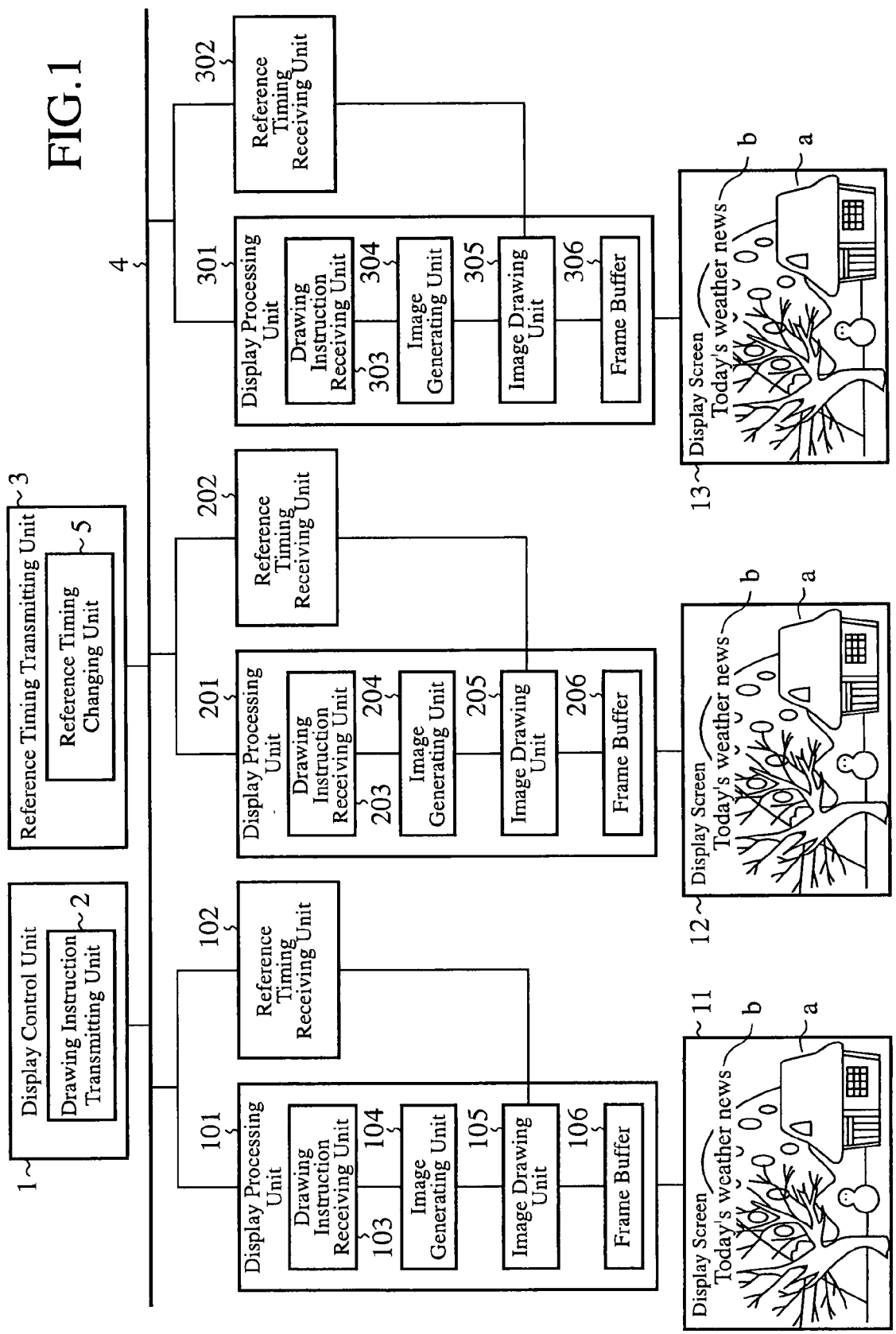
FIG. 1 is a block diagram showing the structure of a screen synchronous control apparatus in accordance with embodiment 1 of the present invention.

FIG. 1 is a block diagram showing the structure of a screen synchronous control apparatus in accordance with embodiment 1 of the present invention. This screen synchronous control apparatus is provided with a display control unit 1, a reference timing transmitting unit 3, a plurality of display processing units 101, 201, and 301 which correspond to a plurality of display screens 11, 12, and 13, respectively, and a plurality of reference timing receiving units 102, 202, and 302. The display control unit 1, reference timing transmitting unit 3, and display processing units 101, 201, and 301 are connected to one another via a communication line 4. These display processing units 101, 201, and 301 are placed at, for example, a plurality of places, such as station yards, respectively, and display the same advertisement, information, or the like on the display screens 11, 12, and 13, respectively.

In FIG. 1, the display control unit 1 is provided with a drawing instruction transmitting unit 2 for issuing a drawing instruction for making the plurality of display processing units 101, 201, and 301 display image data a, alphabetic data b, etc. which are provided as display data, and the reference timing transmitting unit 3 is provided with a reference timing changing unit 5 for broadcasting a reference timing signal to the plurality of reference timing receiving units 102, 202, and 302 at regular intervals, and for changing the length of the transmission intervals of the reference timing signal which the reference timing transmitting unit 3 issues.

The display processing units 101,201, and 301 displays the same image data a, the same alphabetic data b, or the like on the display screens 11, 12, and 13 corresponding thereto, respectively, and are provided with drawing instruction receiving units 103, 203, and 303, image generating units 104, 204, and 304, image drawing units 105, 205, and 305, and frame buffers 106, 206, and 306, respectively. Each of the reference timing receiving units 102, 202, and 302 receives the reference timing signal from the reference timing transmitting unit 3 at regular intervals.

Each of the drawing instruction receiving units 103, 203, and 303 receives the drawing instruction for displaying the image data a, alphabetic data b, and so on from the drawing instruction transmitting unit 2, and each of the image generating units 104, 204, and 304 receives the drawing instruction from the corresponding one of the drawing instruction receiving units 103, 203, and 303, and generates a drawing image from the image data a, alphabetic data b, and so on. Each of the image drawing units 105, 205, and 305 writes the drawing image from the corresponding one of the image generating units 104, 204, and 304 in the corresponding one of the frame buffers 106, 206, and 306 according to the reference timing signal received by the corresponding one of the reference timing receiving units 102, 202, and 302. Each of the frame buffers 106, 206, and 306 displays the drawing image written therein by the corresponding one of the image drawing units 105, 205, and 305 on the corresponding one of the display screens 11, 12, and 13.

Next, the operation of the screen synchronous control apparatus in accordance with this embodiment of the present invention will be explained.

Figure 2:
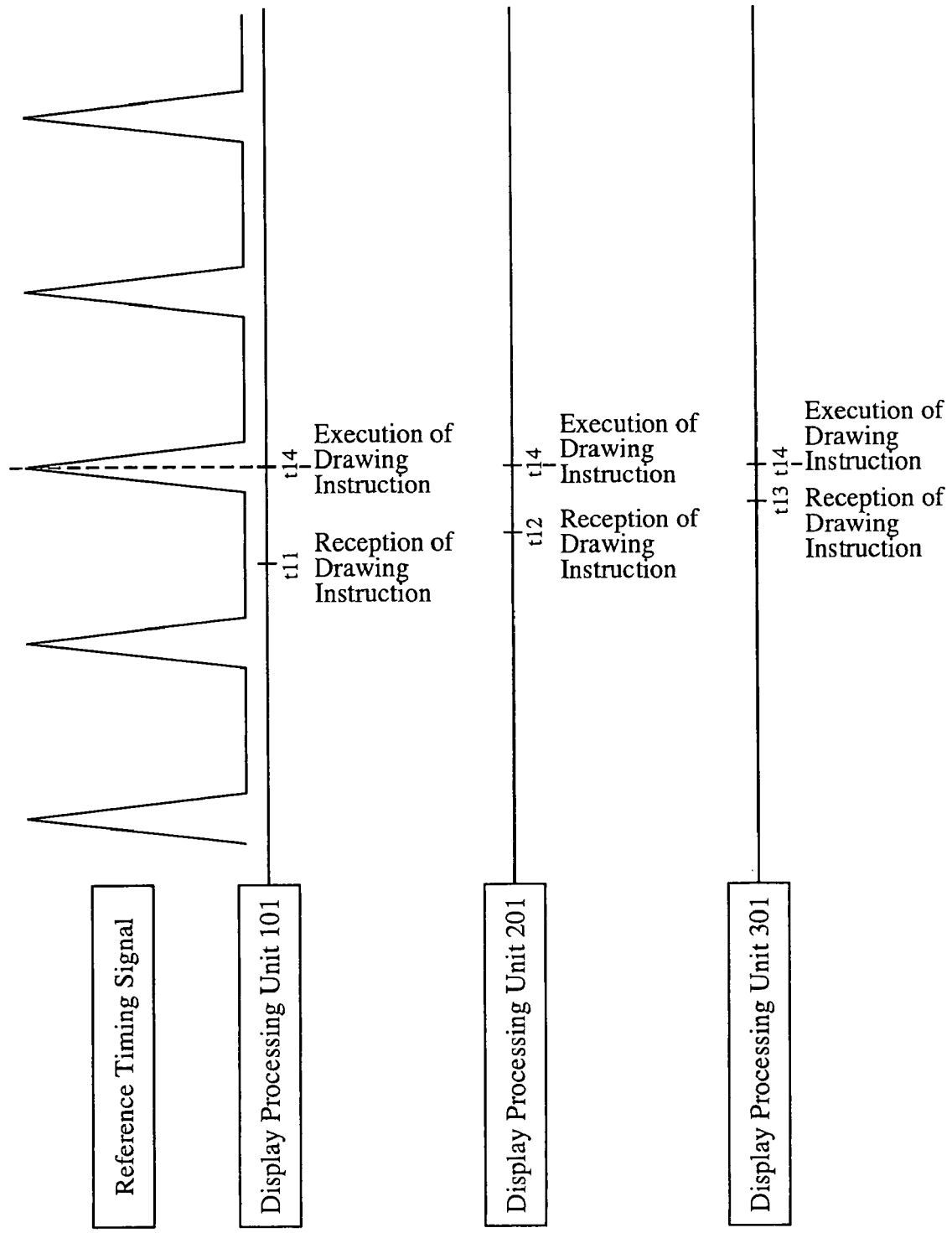
FIG. 2 is a diagram for explaining the operation of the screen synchronous control apparatus in accordance with embodiment 1 of the present invention.

FIG. 2 is a diagram explaining the operation of the screen synchronous control apparatus. In this embodiment, a case in which the screen synchronous control apparatus displays, as display data, image data a and alphabetic data b on each of the display screens 11, 12, and 13 shown in FIG. 1 will be explained as an example.

In this example, each of the display screens 11, 12, and 13 has a screen size of 1024×768, and the image data a is data which consists of 1024×768 pixels and which is displayed from a starting point (0, 0). The alphabetic data b is data which is displayed in an area of 100 pixels height and 900 pixels width from a starting point (100, 50). Information, such as a font size, color, required to form characters, as well as information about the display area, are included in this alphabetic data b.

The reference timing transmitting unit 3 shown in FIG. 1 transmits a reference timing signal about display of the image data and alphabetic to each of the reference timing receiving units 102, 202, and 302 at regular intervals via broadcast communications. Each of the reference timing receiving units 102, 202, and 302 receives the reference timing signal at regular intervals.

The drawing instruction transmitting unit 2 of the display control unit 1 transmits the image data a and alphabetic data b, as the display data, to the drawing instruction receiving unit 103 so that they can be drawn at a specific position of the display screen 11, and the drawing instruction receiving unit 103 receives a drawing instruction at a time tll shown in FIG. 2. The drawing instruction receiving unit 103 outputs the drawing instruction which it has received to the image generating unit 104, and the image generating unit 104 generates a drawing image according to the drawing instruction from the drawing instruction receiving unit 103 and outputs the drawing image to the image drawing unit 105. When the image drawing unit 105 writes the drawing image in the frame buffer 106 at a time tl4 shown in FIG. 2 according to the reference timing signal from the reference timing receiving unit 102, the display processing unit 101 executes the drawing instruction.

Similarly, also in the display processing units 201 and 301, the drawing instruction receiving units 203 and 303 receive the drawing instruction from the drawing instruction transmitting unit 2 at times t12 and t13 shown in FIG. 2, respectively, and the image drawing units 205 and 305 execute the drawing instruction by writing drawing images in the frame buffers 206 and 306 at a time t14 shown in FIG. 2 according to the reference timing signal from the reference timing receiving units 202 and 302, respectively.

The reference timing changing unit 5 of the reference timing transmitting unit 3 changes the length of the transmission intervals of the reference timing signal if needed. For example, in a case in which either of the display processing units 101, 201, and 301 shown in FIG. 2 is under a heavy load, and cannot spare a minute to receive the drawing instruction, the reference timing changing unit can change the length of the transmission intervals of the reference timing signal so as to allow each of the display processing units to delay executing the drawing instruction.

As mentioned above, this embodiment 1 provides an advantage of being able to simultaneously display the same description on the plurality of display screens 11, 12, and 13 with the simple structure.

Furthermore, it is clear that even in a case in which the same description is not displayed on the plurality of display screens, e.g., in a case in which only a character string in the alphabetic data b differs among the plurality of display screens, or in a case in which similar descriptions are respectively displayed on the plurality of display screens, such as a case in which image data a having much the same pixel number is displayed on each of the plurality of display screens and different descriptions are respectively displayed on them, similar descriptions can be respectively displayed simultaneously on the plurality of display screens. In addition, it is clear that even in a case in which the display screens 11, 12, and 13 are not independent of one another and are a plurality of display areas into which a single display screen is divided, and the same description is displayed on each of them in order to enhance the effect of the display, the screen synchronous control method in accordance with this embodiment can be implemented.

Embodiment 2

In this embodiment 2, a synchronous control method of issuing a reference timing signal and a drawing instruction at regular intervals via broadcast communications, and simultaneously displaying data at a timing determined by the reference timing signal at a plurality of receive sides will be explained.

Figure 3:
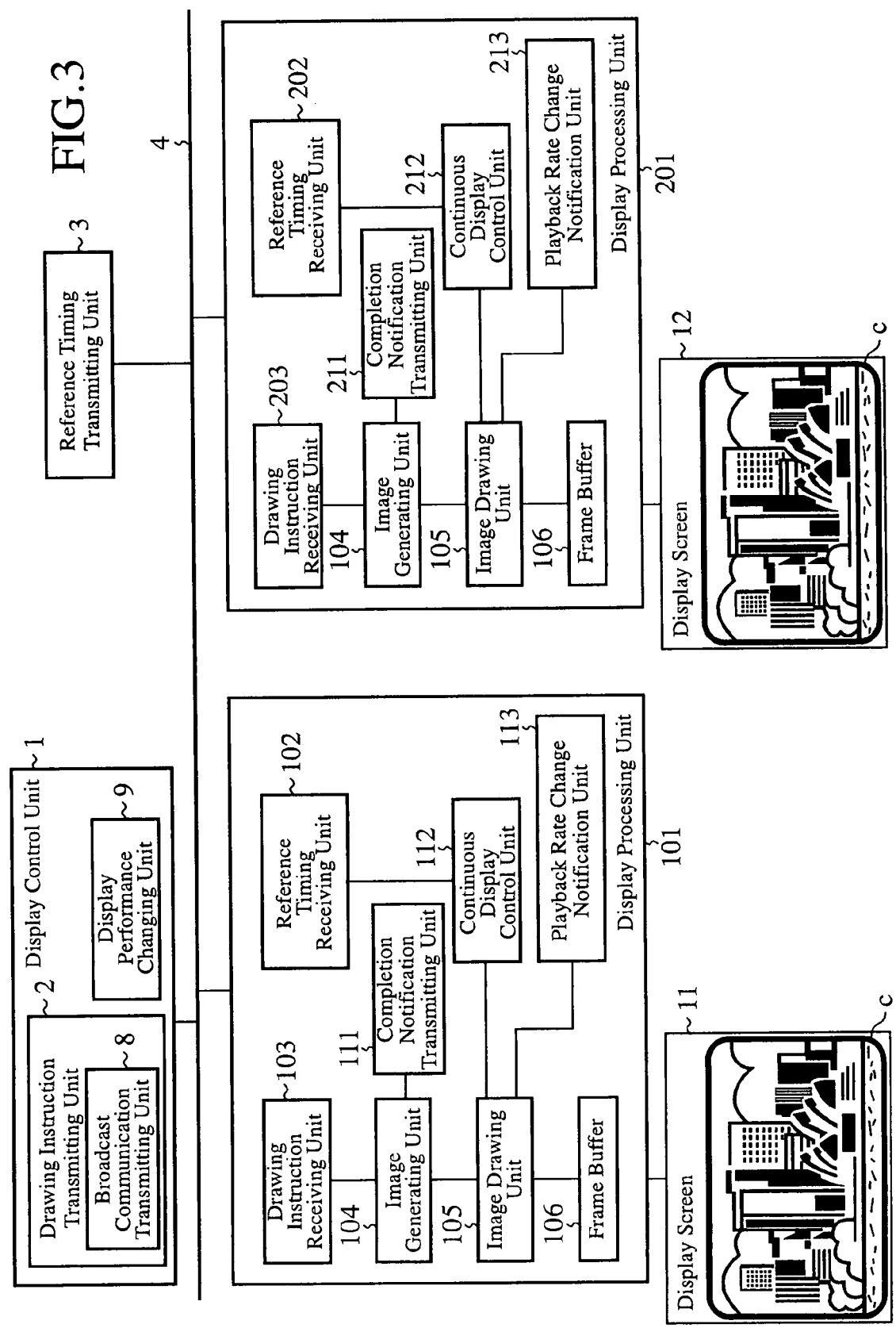
FIG. 3 is a block diagram showing the structure of a screen synchronous control apparatus in accordance with embodiment 2 of the present invention.

FIG. 3 is a block diagram showing the structure of a screen synchronous control apparatus in accordance with embodiment 2 of the present invention. This screen synchronous control apparatus is provided with a display control unit 1, a reference timing transmitting unit 3, and a plurality of display processing units 101 and 201 which correspond to the plurality of display screens 11 and 12, respectively. The display control unit 1, reference timing transmitting unit 3, and display processing units 101 and 201 are connected to one another via a communication line 4. These display processing units 101 and 201 are placed at, for example, a plurality of places, such as station yards, respectively, and display the same advertisement, information, or the like on the display screens 11 and 12, respectively.

In FIG. 3, the display control unit 1 is provided with a drawing instruction transmitting unit 2 which issues a drawing instruction to the plurality of display processing units 101 and 201, and a drawing instruction transmitting unit 2 is provided with a broadcast communication transmitting unit 8 for transmitting the drawing instruction via broadcast communications, and a display performance changing unit 9 for making a correction to the description of the drawing instruction. The reference timing transmitting unit 3 broadcasts a reference timing signal to the plurality of reference timing receiving units 102 and 202 at regular intervals.

The display processing units 101 and 201 display the same moving image data a or the like on the display screens 11 and 12 corresponding thereto, respectively, and are provided with reference time receiving units 102 and 202, drawing instruction receiving units 103 and 203, image generating units 104 and 204, image drawing units 105 and 205, frame buffers 106 and 206, completion notification transmitting units 111 and 211, continuous display control units 112 and 212, and playback rate change notification units 113 and 213, respectively.

Each of the reference timing receiving units 102 and 202 receives the reference timing signal from the reference timing transmitting unit 3 at regular intervals. Each of the drawing instruction receiving units 103 and 203 receives the drawing instruction for displaying the moving image data c and so on from the drawing instruction transmitting unit 2, and each of the image generating units 104 and 204 receives the drawing instruction from the corresponding one of the drawing instruction receiving units 103 and 203, and generates a drawing image from the moving image data c and so on. Each of the completion notification transmitting units 111 and 211 receives information indicating completion of the generation of the image from the corresponding one of the image generating units 104 and 204, and answers the drawing instruction transmitting unit 2. Each of the image drawing units 105 and 205 writes the drawing image from the corresponding one of the image generating units 104 and 204, which is received by the corresponding one of the reference timing receiving units 102 and 202, in the corresponding one of the frame buffers 106 and 206 according to the reference timing signal via the corresponding one of the continuous display control units 112 and 212. Each of the frame buffers 106 and 206 displays the drawing image written there into by the corresponding one of the image drawing units 105 and 205 on the corresponding one of the display screens 11 and 12.

In a case in which there is a possibility that the display data is moving image data c about an advertisement or the like and are displayed repeatedly, each of the continuous display control units 112 and 212 achieves synchronization between the display of the moving image data and the reference timing signal again at each head of the repetition. In a case in which the display data is data having movements, such as moving image data c, and cannot be played back at a frame rate specified by the drawing instruction transmitting unit 2, each of the playback rate change notification units 113 and 213 transmits error information to the drawing instruction transmitting unit 2.

Next, the operation of the screen synchronous control apparatus in accordance with this embodiment of the present invention will be explained.

Figure 4:
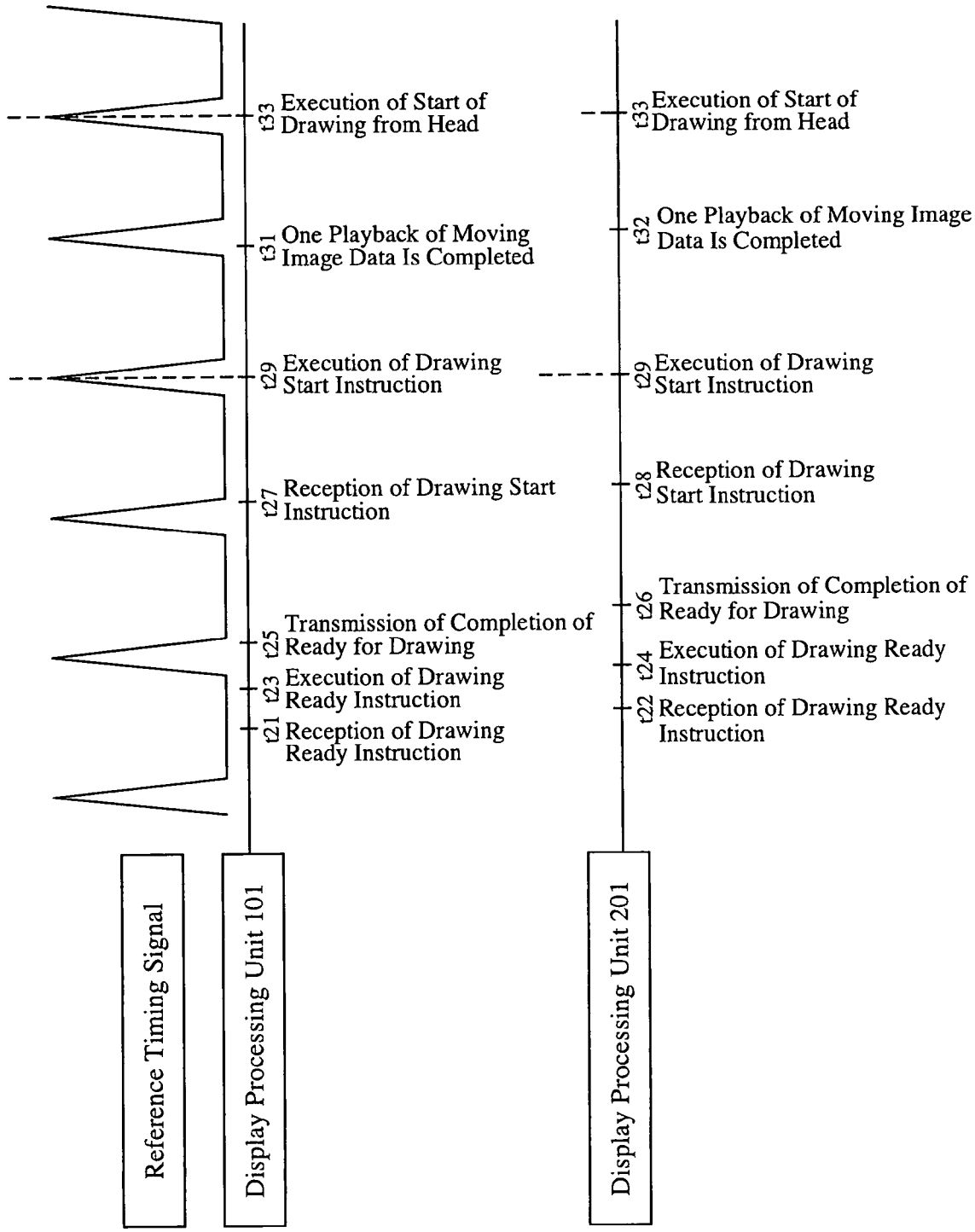
FIG. 4 is a diagram for explaining the operation of the screen synchronous control apparatus in accordance with embodiment 2 of the present invention.

FIG. 4 is a diagram explaining the operation of the screen synchronous control apparatus. In this embodiment, a case in which moving image data c is displayed on each of the display screens 11 and 12 shown in FIG. 3 will be explained as an example.

In this example, each of the display screens 11 and 12 has a screen size of 1024×768, and the moving image data c is data which consists of 1024×768 pixels and which is displayed at a frame rate of 30 frames/sec and from a starting point (0, 0).

The broadcast communication transmitting unit 8 of the reference timing transmitting unit 3 shown in FIG. 3 transmits a reference timing signal about display of the moving image data to the reference timing signal receiving units 102 and 202 at regular intervals via broadcast communications. Each of the reference timing signal receiving units 102 and 202 receives the reference timing signal at regular intervals.

The broadcast communication transmitting unit 8 of the drawing instruction transmitting unit 2 in the display control unit 1 broadcasts, as display data, the moving image data c to the drawing instruction receiving units 103 and 203 so that each of them can be ready to display the moving image data at a specific position, and the drawing instruction receiving units 103 and 203 receive a drawing ready instruction at a time t21 and at a time t22 shown in FIG. 4, respectively. Each of the drawing instruction receiving units 103 and 203 outputs the drawing ready instruction which it has received to the corresponding one of the image generating units 104 and 204. The image generating units 104 and 204 execute the drawing ready instruction at a time t23 and at a time t24 by generating a drawing image according to the drawing ready instruction, respectively, and notify the completion notification transmitting units 111 and 211 that the generation of the drawing image has been completed, respectively. The completion notification transmitting units 111 and 211 transmits information about the completion of getting ready for drawing by notifying the drawing instruction transmitting unit 2 that the generation of the drawing image has been completed at a time t25 and at a time t26 shown in FIG. 4, respectively.

When receiving the notification of the completion of the generation of the drawing image from all of the completion notification transmitting units 111 and 211, the drawing instruction transmitting unit 2 broadcasts a drawing start instruction to the drawing instruction receiving units 103 and 203 so that the display processing units start drawing the generated drawing images, respectively, by means of the broadcast communication transmitting unit 8. The drawing instruction receiving units 103 and 203 receive the drawing start instruction at a time t27 and at a time t28 shown in FIG. 4, and transmit the drawing start instruction for drawing the image data to the image generating units 104 and 204, respectively. The image generating units 104 and 204 output the generated drawing images to the image drawing units 105 and 205, respectively. The image drawing units 105 and 205 write the drawing images in the frame buffers 106 and 206 at a time t29 shown in FIG. 4 according to the reference timing signal transmitted thereto, via the continuous display control units 112 and 212, from the reference timing receiving units 102 and 202, respectively, and each of the display processing units 101 and 201 executes the drawing start instruction.

Each of the image drawing units 105 and 205 notifies error information to the corresponding one of the playback rate change notification units 113 and 213 in a case in which the drawing image based on the moving image data c cannot be displayed at a specified frame rate, in this case, at a frame rate of 30 frames/sec. In such a case, each of the playback rate change notification units 113 and 213 can transmit the error information to the drawing instruction transmitting unit 2. When the drawing instruction transmitting unit 2 receives the error information from either or both of the playback rate change notification units 113 and 213, the display performance changing unit 9 broadcasts a change in the frame rate to the drawing instruction receiving units 103 and 203 by means of the broadcast communication transmitting unit 8. Each of the drawing instruction receiving units 103 and 203 notifies an instruction for drawing the image with the frame rate being changed by the display performance changing unit to the corresponding one of the image generating units 104 and 204, each of the image generating units 104 and 204 generates a drawing image based on the moving image data c with the frame rate being changed by the display performance changing unit, and similarly notifies an execution instruction for drawing the image to the corresponding one of the image drawing units 105 and 205, and each of the image drawing units 105 and 205 executes the drawing instruction according to the reference timing signal transmitted thereto, via the corresponding one of the continuous display control units 112 and 212, from the corresponding one of the reference timing receiving units 102 and 202.

The continuous display control units 112 and 212 notify a start of repeatedly playback of the drawing image to the image drawing units 105 and 205 again according to the reference timing signal received from the reference timing receiving units 102 and 202 at a time t31 and at a time t32 shown in FIG. 4 at which one playback of the moving image data c is completed, respectively. Each of the image drawing units 105 and 205 starts drawing the drawing image from the head of the drawing image based on the moving image data c according to the reference timing signal at a time t33 shown in FIG. 4.

As mentioned above, this embodiment 2 offers an advantage of being able to simultaneously display the same description on the display screens 11 and 12 with a simple structure even in a case in which the drawing ready instruction and the drawing start instruction are broadcast to the plurality of display processing units.

This embodiment offers another advantage of being able to adjust variations in the frame rate at which the moving image data c can be played back, and to carry out a synchronous display of the moving image data on the plurality of display screens. This embodiment offers a further advantage of being able to prevent the synchronous timing from shifting little by little by adjusting the synchronous timing also in the repeatedly playback of the drawing image based on the moving image data c.

Embodiment 3

In this embodiment 3, a synchronous control method of issuing a reference timing signal at regular intervals via broadcast communications, transmitting drawing instructions one after another, and simultaneously displaying an image at a plurality of display sides by simultaneously carrying out a switching between frame buffers for display at a timing determined by the reference timing signal will be explained.

Figure 5:
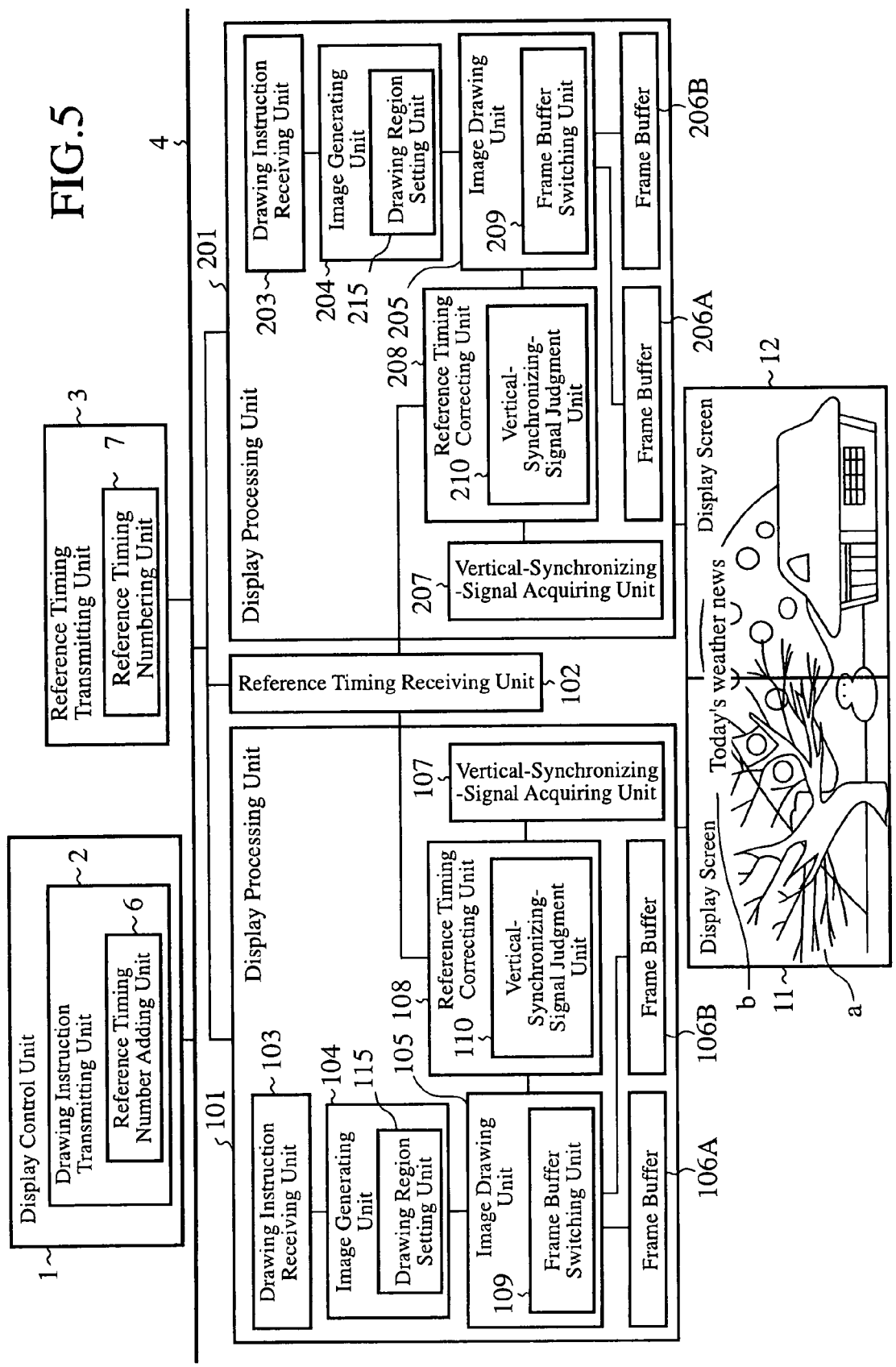
FIG. 5 is a block diagram showing the structure of a screen synchronous control apparatus in accordance with embodiment 3 of the present invention.

FIG. 5 is a block diagram showing the structure of a screen synchronous control apparatus in accordance with embodiment 3 of the present invention. This screen synchronous control apparatus is provided with a display control unit 1, a reference timing transmitting unit 3, a plurality of display processing units 101 and 201 which correspond to a plurality of display screens 11 and 12, respectively, and a reference timing receiving unit 102. The display control unit 1, reference timing transmitting unit 3, display processing units 101 and 201, and reference timing receiving unit 102 are connected to one another via a communication line 4. These display processing units 101 and 201 are placed at, for example, a plurality of places, such as station yards, respectively, and display divided parts of an advertisement, information, or the like on the display screens 11 and 12, respectively.

In FIG. 5, the display control unit 1 is provided with a drawing instruction transmitting unit 2 for transmitting a drawing instruction to the plurality of display processing units 101 and 201, and the drawing instruction transmitting unit 2 includes a reference timing number assigning unit 6 for assigning the number of an asserted level of the reference timing signal to the drawing instruction. The reference timing transmitting unit 3 includes a reference timing numbering unit 7 for transmitting the reference timing signal to the reference timing receiving unit 102 at regular intervals, and for numbering asserted levels of the reference timing signal.

The reference timing receiving unit 102 receives the reference timing signal from the reference timing transmitting unit 3 at regular intervals. Each of the display processing units 101 and 201 draws and displays image data a, alphabetic data b, and so on on the corresponding one of the display screens 11 and 12. The display processing units 101 and 201 are provided with drawing instruction receiving units 103 and 203, image generating units 104 and 204, image drawing units 105 and 05, frame buffers 106A and 106B, and 206A and 206B, vertical-synchronizing-signal acquiring units 107 and 207, and reference timing correcting units 108 and 208, respectively.

Each of the drawing instruction receiving units 103 and 203 receives the drawing instruction for displaying the image data a, alphabetic data b, and so on from the drawing instruction transmitting unit 2, and each of the image generating units 104 and 204 receives the drawing instruction from the corresponding one of the drawing instruction receiving units 103 and 203 and generates a drawing image based on the image data a, alphabetic data b, and so on. The image generating units 104 and 204 are provided with drawing region setting units 115 and 215 each for setting up a drawing region when generating the image, respectively. Each of the image drawing units 105 and 205 writes the drawing image from the corresponding one of the image generating units 104 and 204 in either of the corresponding ones of the frame buffers 106A and 106B, and 206A and 206B. The image drawing units 105 and 205 are respectively provided with frame buffer switching units 109 and 209 each for switching between the corresponding frame buffers to switch between a back surface, which is a non-display surface, and a display surface according to the reference timing signal received from the corresponding one of the reference timing correcting units 108 and 208, and for displaying an image stored in the selected frame buffer on the corresponding one of the display screens 11 and 12.

Each of the vertical-synchronizing-signal acquiring units 107 and 207 acquires a vertical synchronizing signal from the corresponding one of the display screens 11 and 12. The reference timing correcting units1O8 and 208 are respectively provided with vertical-synchronizing-signal judgment units 110 and 210 each for correcting the reference timing signal according to the vertical synchronizing signal, and for judging whether to carry out the correction according to which asserted level of the vertical synchronizing signal when correcting the reference timing signal. The drawing image is written into each of the frame buffers 106A and 106B by the image drawing unit 105, and the drawing image is written in each of the frame buffers 206A and 206B by the image drawing unit 205. Each of the frame buffer switching units 109 and 209 switches between the back surface and the display surface of the corresponding frame buffers according to the reference timing signal received from the corresponding one of the reference timing correcting units 108 and 208, and displays the corresponding image on the display screen. Each of the display screens 11 and 12 displays the drawing image stored in the display surface among the corresponding ones of the frame buffers 106A and 106B, and 206A and 206B.

Next, the operation of the screen synchronous control apparatus in accordance with this embodiment of the present invention will be explained.

Figure 6:
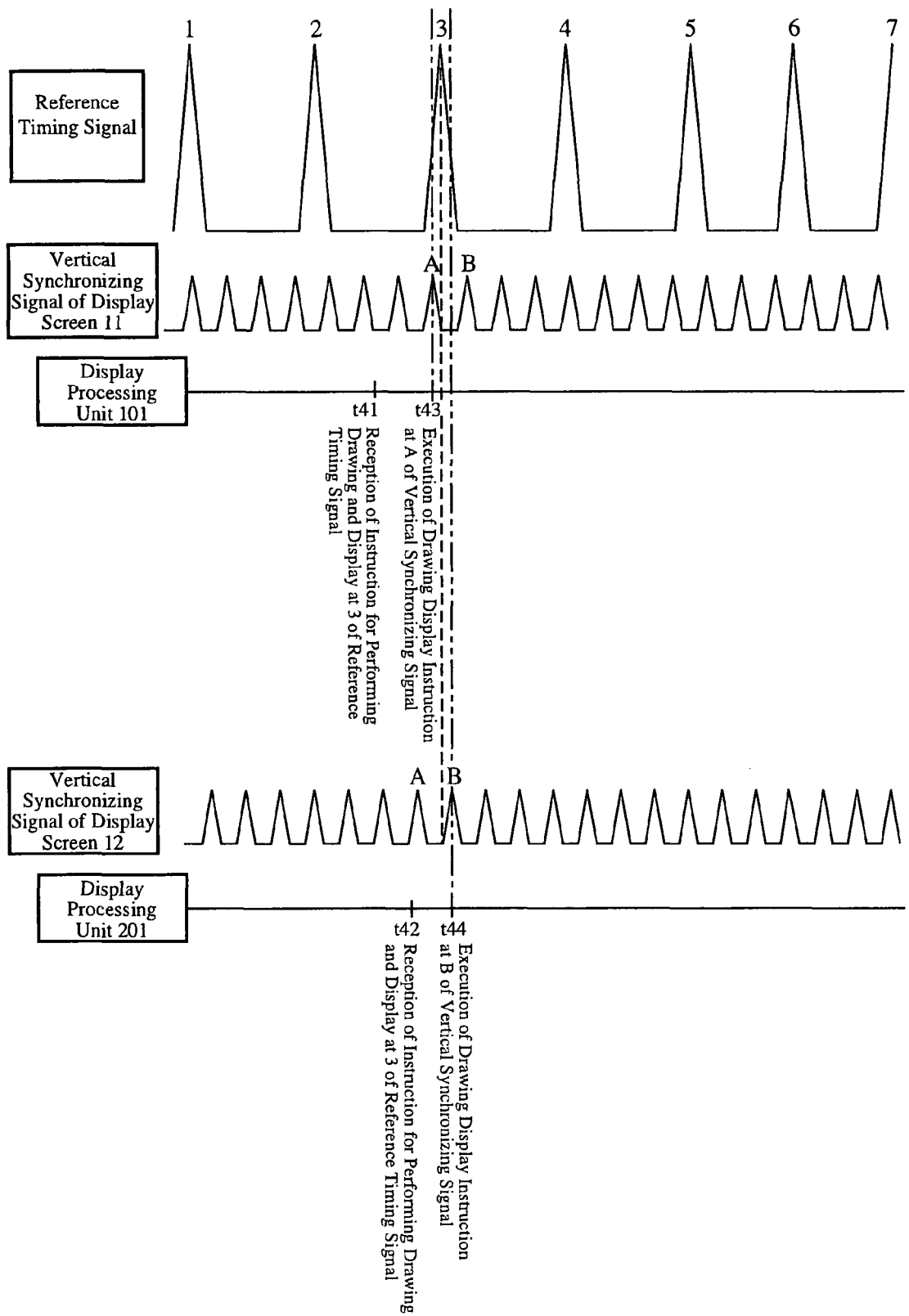
FIG. 6 is a diagram for explaining the operation of the screen synchronous control apparatus in accordance with embodiment 3 of the present invention.

FIG. 6 is a diagram explaining the operation of the screen synchronous control apparatus. In this embodiment, a case in which the screen synchronous control apparatus displays, as display data, image data a and alphabetic data b on each of the display screens 11 and 12 will be explained as an example. In this example, each of the display screens 11 and 12 has a screen size of 1024×768, and the image data a is data which consists of 2048×768 pixels and which is displayed from a starting point (0, 0). The alphabetic data b is data which is displayed in an area of 100 pixels height and 900 pixels width from a starting point (600, 50). Information, such as a font size and color required to form characters, as well as information about the display area, are included in this alphabetic data b.

The reference timing transmitting unit 3 of FIG. 5 transmits the reference timing signal about display having asserted levels which are numbered by the reference timing numbering unit 7, to the reference timing signal receiving unit 102 at regular intervals via broadcast communications. The reference timing signal receiving unit 102 receives the numbered reference timing signal at regular intervals.

After the drawing instruction transmitting unit 2 in the display control unit 1 specifies at which asserted level of the reference timing signal each display processing unit should display the image by means of the reference timing number adding unit 6, the drawing instruction transmitting unit 2 transmits, as display data, the image data a and alphabetic data b to the drawing instruction receiving units 103 and 203 so that they are drawn at a specified position of each of the display screens 11 and 12.

The drawing instruction receiving units 103 and 203 receive the drawing instruction for drawing and displaying the image at a timing determined by the reference timing signal 3 at a time t41 and at a time t42 shown in FIG. 6, respectively, and outputs the received drawing instruction to the image generating units 104 and 204, respectively. Each of the image generating units 104 and 204 generates a drawing image having a converted drawing region specified by the corresponding one of the drawing region setting units 115 and 215, and outputs it to the corresponding one of the image drawing units 105 and 205.

In a case in which the drawing region set up by the drawing region setting unit 115 is (0, 0, 1024, 768) and the drawing region set up by the drawing region setting unit 215 is (1024, 0, 2048, 768), the image generating unit 104 generates an image having only a region of 1024×768 in which a display starting point is set to (0, 0) for the image data a, and generates an image having a region of 50 pixels height and 424 pixels width in which a display starting point is set to (600, 50) for the alphabetic data b. The image generating unit 204 generates an image having only a region of 1024×768 in which a display starting point is set to (1024, 0) for the image data a, and generates an image having a region of 50 pixels height and 476 pixels width in which a display starting point is set to (424, 50) for the alphabetic data b.

The image drawing unit 105 writes the generated drawing image in either of the frame buffers 106A and 106B, while the image drawing unit 205 writes the generated drawing image in either of the frame buffers 206A and 206B.

Each of the vertical-synchronizing-signal acquiring unit 107 and 207 acquires the vertical synchronizing signal from the corresponding one of the display screens 11 and 12, and outputs it to the corresponding one of the vertical-synchronizing-signal judgment units 110 and 210 respectively disposed in the reference timing correcting units 108 and 208. Each of the vertical-synchronizing-signal judgment units 110 and 210 receives the reference timing signal 3 from the reference timing receiving unit 102, and compares it with the vertical synchronizing signal outputted from the corresponding one of the vertical-synchronizing-signal acquiring units 107 and 207 so as to judge at which asserted level of the vertical synchronizing signal the display processing unit should display the drawing image.

The frame buffer switching unit 109 switches between display using the frame buffer 106A and display using the frame buffer 106B at each timing of the vertical synchronizing signal determined by the reference timing correcting unit 108, and the frame buffer switching unit 209 switches between display using the frame buffer 206A and display using the frame buffer 206B at each timing of the vertical synchronizing signal determined by the reference timing correcting unit 208.

Hereafter, assume that the reference timing signal and vertical synchronizing signal have waveforms as shown in FIG. 6. Although the drawing instruction for starting the drawing and display at a timing determined by an asserted level numbered 3 of the reference timing signal is transmitted from the display control unit 1, this timing does not necessarily match with the timing of the vertical synchronizing signal. If anything, there are many cases in which the timing determined by the reference timing signal does not match with the timing of the vertical synchronizing signal. As shown in FIG. 6, an asserted level of the vertical synchronizing signal which is the nearest to the asserted level numbered 3 of the reference timing signal is A in the display processing unit 101, and an asserted level B of the vertical synchronizing signal is nearer to the asserted level numbered 3 of the reference timing signal than an asserted level A in the display processing unit 201. Because the switching between the frame buffers 106A and 106B is carried out according to the corresponding vertical synchronizing signal, and the switching between the frame buffers 206A and 206B is carried out according to the corresponding vertical synchronizing signal, the display processing unit 101 displays the drawing image by switching between the frame buffers 106A and 106B according to the asserted level A of the vertical synchronizing signal at a time t43 shown in FIG. 6, while the display processing unit 201 displays the drawing image by switching between the frame buffers 206A and 206B according to the asserted level B of the vertical synchronizing signal at a time t44 shown in FIG. 6.

In a typical display monitor having a frequency of 60 HZ, a vertical synchronizing signal having a period of 6.6 msec/frame is generated, and rewriting of the display screen is carried out at intervals corresponding to the period. Therefore, it is clear that it is the most effective to carry out an update of the screen at intervals corresponding to the period. In above-mentioned embodiments 1 and 2, a time lag of the order, at most, of 16.6 msec may occur in the display of the drawing image because each display processing unit displays the drawing image without taking the vertical synchronizing signal into consideration. In contrast, in this embodiment 3, a time lag of the order, at most, of only about one-half of 16.6 msec may occur in the display of the drawing image because each display processing unit displays the drawing image by taking the vertical synchronizing signal into consideration.

As mentioned above, this embodiment 3 offers an advantage of being able to carry out a more-precise synchronous display of the drawing image with a simple structure by switching between the frame buffers 106A and 106B, and between the frame buffers 206A and 206B according to an asserted level of the vertical synchronizing signal which is the nearest to that of the reference timing signal.

This embodiment offers another advantage of being able to produce a continuous screen display which can be considered to be a large screen display in spite of producing a different screen display, as shown in each of the display screens 11 and 12 of FIG. 5, by setting up a drawing region for each display. Although the screen synchronous control apparatus in accordance with this embodiment 3 has the two display screens, as previously mentioned, it is clear that a high resolution display can be implemented by increasing the number of the display screens.

Embodiment 4

In this embodiment 4, a synchronous control method of issuing a reference timing signal at regular intervals via broadcast communications, transmitting a drawing instruction to a receive side, making the receive side transfer the received drawing instruction to an adjacent receive side, and simultaneously displaying an image at the receive sides at a timing determined by the reference timing signal will be explained.

Figure 7:
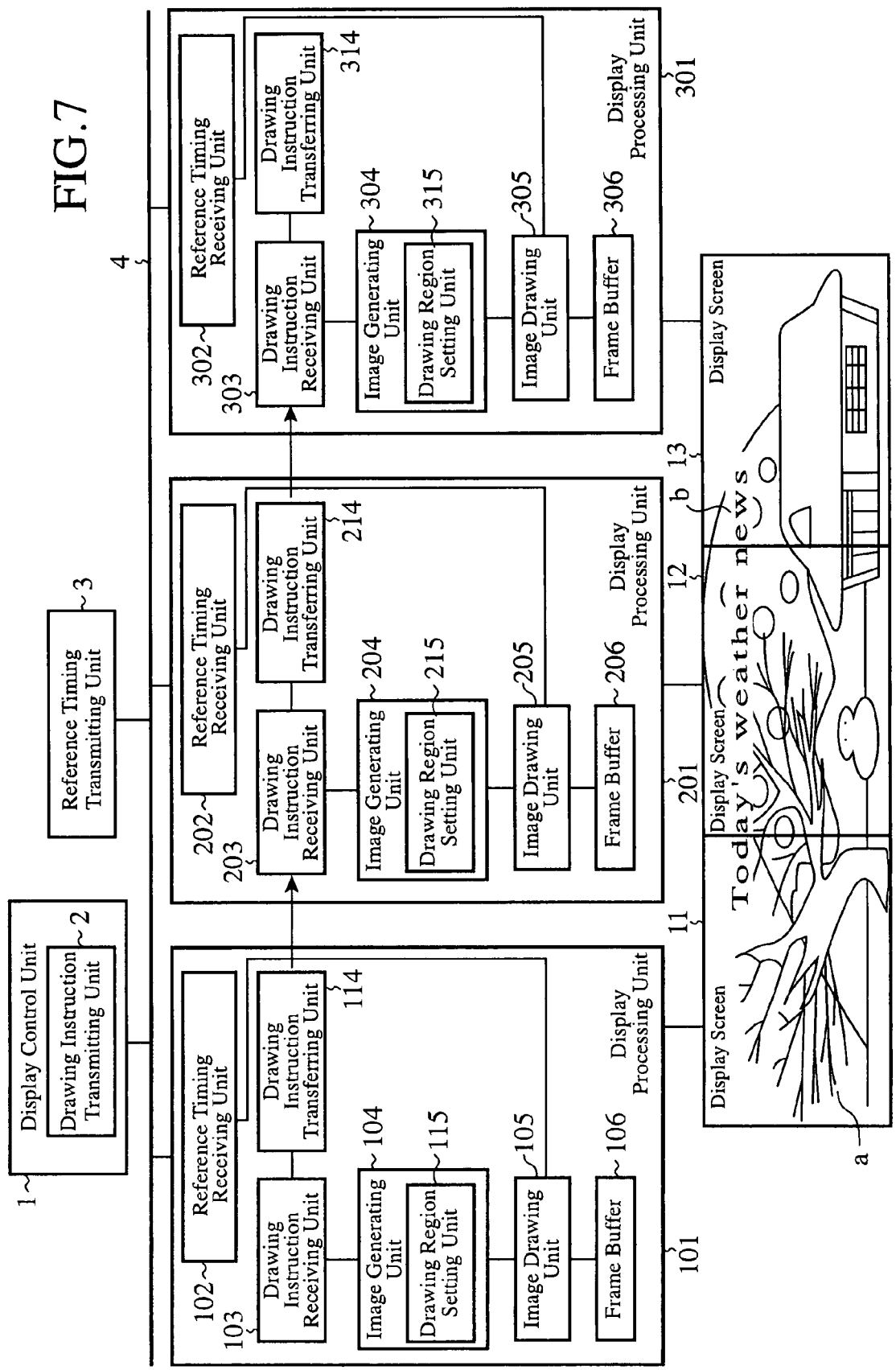
FIG. 7 is a block diagram showing the structure of a screen synchronous control apparatus in accordance with embodiment 4 of the present invention.

FIG. 7 is a block diagram showing the structure of a screen synchronous control apparatus in accordance with embodiment 4 of the present invention. This screen synchronous control apparatus is provided with a display control unit 1, a reference timing transmitting unit 3, and a plurality of display processing units 101, 201, and 301 which correspond to a plurality of display screens 11, 12, and 13, respectively. The display control unit 1, reference timing transmitting unit 3, and display processing units 101, 201, and 301 are connected to one another via a communication line 4. These display processing units 101, 201, and 301 are placed at, for example, a plurality of places, such as station yards, respectively, and display divided parts of an advertisement, information, or the like on the display screens 11, 12, and 13, respectively.

As shown in FIG. 7, the display control unit 1 is provided with a drawing instruction transmitting unit for issuing a drawing instruction for displaying, as display data, image data a, alphabetic data b, and so on to either one of the plurality of display processing units 101, 201, and 301, and the reference timing transmitting unit 3 broadcasts a reference timing signal to the plurality of reference timing receiving units 102, 202, and 302 at regular intervals.

Each of the display processing units 101, 201, and 301 draws and displays the image data a, alphabetic data b, and so on on the corresponding one of the display screens 11, 12, and 13. The display processing units 101, 201, and 301 are provided with reference timing receiving units 102, 202, and 302, drawing instruction receiving units 103, 203, and 303, image generating units 104, 204, and 304, image drawing units 105, 205, and 305, frame buffers 106, 206, and 306, and drawing instruction transferring units 114, 214, and 314, respectively.

Each of the reference timing receiving units 102, 202, and 302 receives the reference timing signal from the reference timing transmitting unit 3 at regular intervals. The drawing instruction receiving unit 103 receives the drawing instruction from the drawing instruction transmitting unit 2, and the drawing instruction transferring unit 114 transfers the drawing instruction received by the drawing instruction receiving unit 103 to the drawing instruction receiving unit 203 in the adjacent display processing unit 201. The image generating unit 104 receives the drawing instruction from the drawing instruction receiving unit 103 and then generates a drawing image. The image generating unit 104 is provided with a drawing region setting unit 115 for setting up a region when generating the image. The image drawing unit 105 then writes the drawing image from the image generating unit 104 in the frame buffer 106.

In the display processing units 201 and 301, the drawing instruction receiving units 203 and 303 similarly receive the drawing instruction from the drawing instruction transferring units 114 and 214, respectively, and the drawing instruction transferring units 214 and 314 transfer the drawing instruction received by the drawing instruction receiving units 203 and 303 to the drawing instruction receiving units 303 and 103 in the adjacent display processing units 301 and 101, respectively. The image generating units 204 and 304 receive the drawing instruction from the drawing instruction receiving units 203 and 303 and then generate drawing images, respectively, and the drawing region setting units 215 and 315 set up drawing regions when the image generating units 204 and 304 generate the images, respectively. The image drawing units 205 and 305 then write the drawing images generated by the image generating units 204 and 304 in the frame buffers 206 and 306, respectively. The drawing images stored in the frame buffers 106, 206, and 306 are then displayed on the display screens 11, 12, and 13, respectively.

Next, the operation of the screen synchronous control apparatus in accordance with this embodiment of the present invention will be explained.

Figure 8:
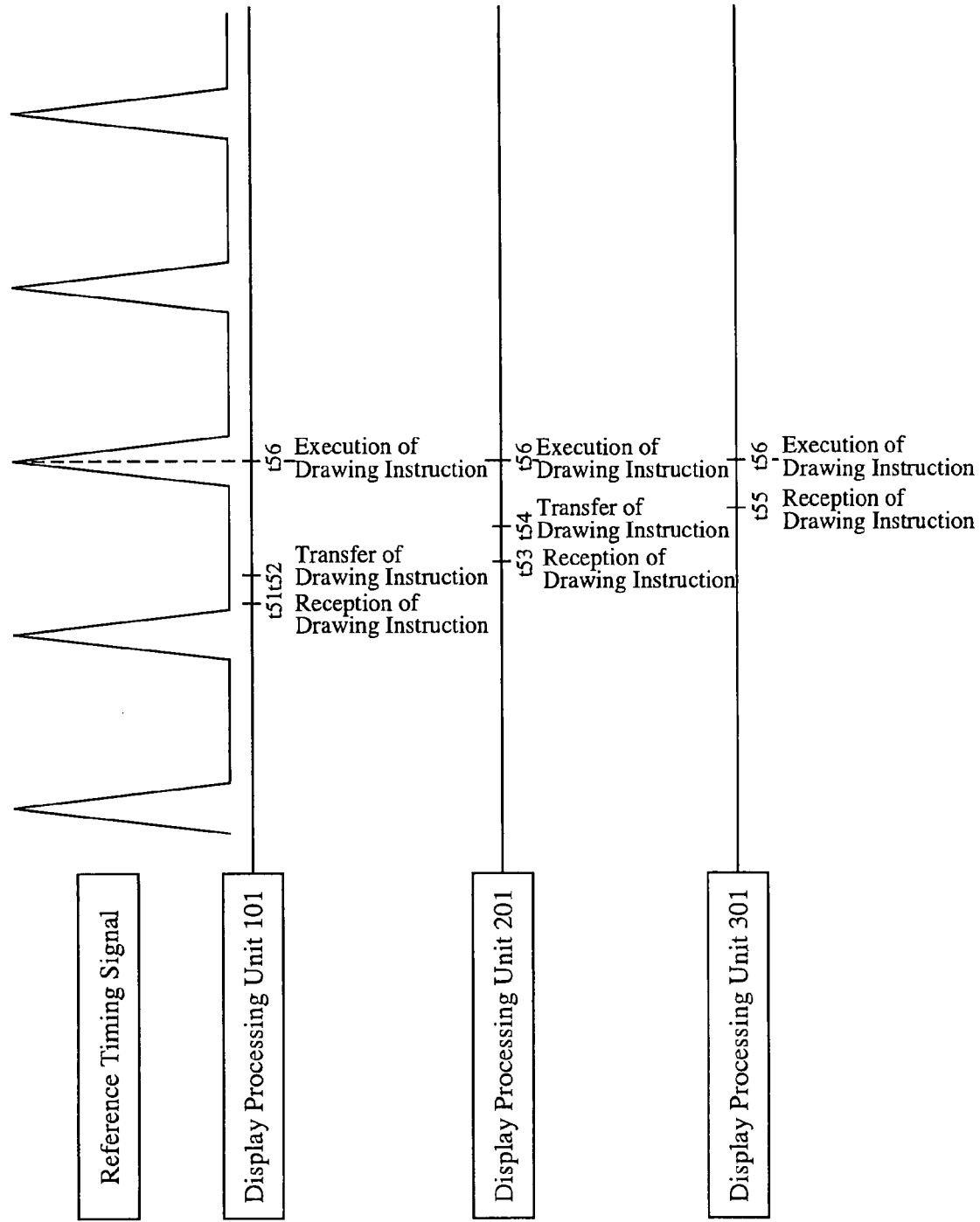
FIG. 8 is a diagram for explaining the operation of the screen synchronous control apparatus in accordance with embodiment 4 of the present invention.

FIG. 8 is a diagram explaining the operation of the screen synchronous control apparatus. In this embodiment, a case in which the screen synchronous control apparatus displays, as display data, image data a and alphabetic data b on each of the display screens 11, 12, and 13 will be explained as an example. Each of the display screens 11, 12, and 13 has a screen size of 1024×768, and the image data a is data which consists of 3072×768 pixels and which is displayed from a starting point (0, 0). The alphabetic data b is data which is displayed in an area of 100 pixels height and 1500 pixels width from a starting point (800, 50). Information, such as a font size and color required to form characters, as well as information about the display area, are included in this alphabetic data b.

The reference timing transmitting unit 3 of FIG. 7 transmits the reference timing signal about display to the reference timing receiving units 102, 202, and 302 at regular intervals via broadcast communications. Each of the reference timing receiving units 102, 202, and 302 receives the reference timing signal at regular intervals.

The drawing instruction transmitting unit 2 in the display control unit 2 transmits, as display data, the image data a and alphabetic data b to the drawing instruction receiving unit 103 in the display processing unit 11 so that they are drawn at a specified position of the display screen, and the drawing instruction receiving unit 103 receives the drawing instruction at a time t51 shown in FIG. 8. The drawing instruction receiving unit 103 outputs the received drawing instruction to the image generating unit 104, and also outputs it to the drawing instruction transferring unit 114. The drawing instruction transferring unit 114 then transfers the drawing instruction to the drawing instruction receiving unit 203 in the adjacent display processing unit 201 at a time t52 shown in FIG. 8.

Similarly, the drawing instruction receiving unit 203 receives the drawing instruction at a time t53 shown in FIG. 8, and outputs the received drawing instruction to the image generating unit 204, and also outputs it to the drawing instruction transferring unit 214. The drawing instruction transferring unit 214 then transfers the drawing instruction to the drawing instruction receiving unit 303 in the adjacent display processing unit 301 at a time t54 shown in FIG. 8, and the drawing instruction receiving unit 303 receives the drawing instruction at a time t55 shown in FIG. 8.

Each of the image generating units 104, 204, and 304 generates a drawing image having a converted drawing region specified by the corresponding one of the drawing region setting units 115, 215, and 315, and outputs it to the corresponding one of the image drawing units 105, 205, and 305.

When the drawing region set up by the drawing region setting unit 115 is (0, 0, 1024, 768), the drawing region set up by the drawing region setting unit 215 is (1024, 0, 2048, 768), and the drawing region set up by the drawing region setting unit 315 is (2048, 0, 3072, 768), the image generating unit 104 generates an image having only a region of 1024×768 in which a display starting point is set to (0, 0) for the image data a, and also generates an image having a region of 50 pixels height and 124 pixels width in which a display starting point is set to (900, 50) for the alphabetic data b. The image generating unit 204 generates an image having only a region of 1024×768 in which a display starting point is set to (1024, 0) in the image data a, and generates an image having a region of 50 pixels height and 1024 pixels width in which a display starting point is set to (424, 50) in the alphabetic data b. Similarly, the image generating unit 304 generates an image having only a region of 1024×768 in which a display starting point is set to (2024, 0) in the image data a, and generates an image having a region of 50 pixels height and 1024 pixels width in which a display starting point is set to (1148, 50) in the alphabetic data b.

Each of the image drawing units 105, 205, and 305 writes the generated drawing image in the corresponding one of the frame buffers 106, 206, and 306 at a time t56 shown in FIG. 8 by referring to the reference timing signal received from the corresponding one of the reference timing receiving units 102, 202, and 302, so that the display processing unit 101 executes the drawing instruction and displays the image data a and alphabetic data b on the display screens 11, 12, and 13.

As mentioned above, this embodiment 4 offers an advantage of being able to simultaneously display parts of the same description on the display screens 11, 12, and 13, respectively, with a simple structure by broadcasting the reference timing signal even when using the method of making the plurality of display processing units 101, 201, and 301, which are adjacent to one another, transfer the display instruction to the display processing units 201, 301, and 101, respectively.

This embodiment offers another advantage of being able to produce a continuous screen display which can be considered to be a large screen display in spite of producing a different screen display for each of the display screens 11, 12, and 13 of FIG. 7 by setting up a drawing region for each display.

Although the screen synchronous control apparatus in accordance with this embodiment 4 has the three display screens, as previously mentioned, it is clear that a high resolution display can be implemented by increasing the number of the display screens.

INDUSTRIAL APPLICABILITY

As mentioned above, the screen synchronous control apparatus with a simple structure in accordance with the present invention is suitable for, for example, a case in which the same image or parts of the same image are simultaneously displayed on display screens, respectively.

The invention claimed is:

1. A screen synchronous control apparatus comprising:
a reference timing transmitting unit for transmitting a reference timing signal about display of a plurality of display screens at predetermined intervals;
a display control unit for transmitting a drawing instruction for displaying display data on said plurality of display screens; and
a plurality of display processing units each for receiving the drawing instruction transmitted from said display control unit, for executing the drawing instruction in timing with receiving the reference timing signal transmitted from said reference timing transmitting unit separate from the drawing instruction, and for displaying the display data on a corresponding display screen,
wherein the reference timing transmitting unit includes a reference timing changing unit that changes the predetermined interval at which the reference timing signal is transmitted in order to allow each of the plurality of display processing units sufficient time to receive the drawing instruction.

2. The screen synchronous control apparatus according to claim 1, wherein
said display control unit transmits the drawing instruction for displaying display data on said plurality of display screens to a predetermined display processing unit; and
said plurality of display processing units each receives the drawing instruction transmitted from said display control unit and then transfers it to an adjacent display processing unit, or receives the drawing instruction transferred thereto and then transfers it to another adjacent display processing unit, executes the drawing instruction according to the reference timing signal transmitted from said reference timing transmitting unit, and displays the display data on a corresponding display screen.

* * * * *